United States Patent Office 3,208,760
Patented Sept. 28, 1965

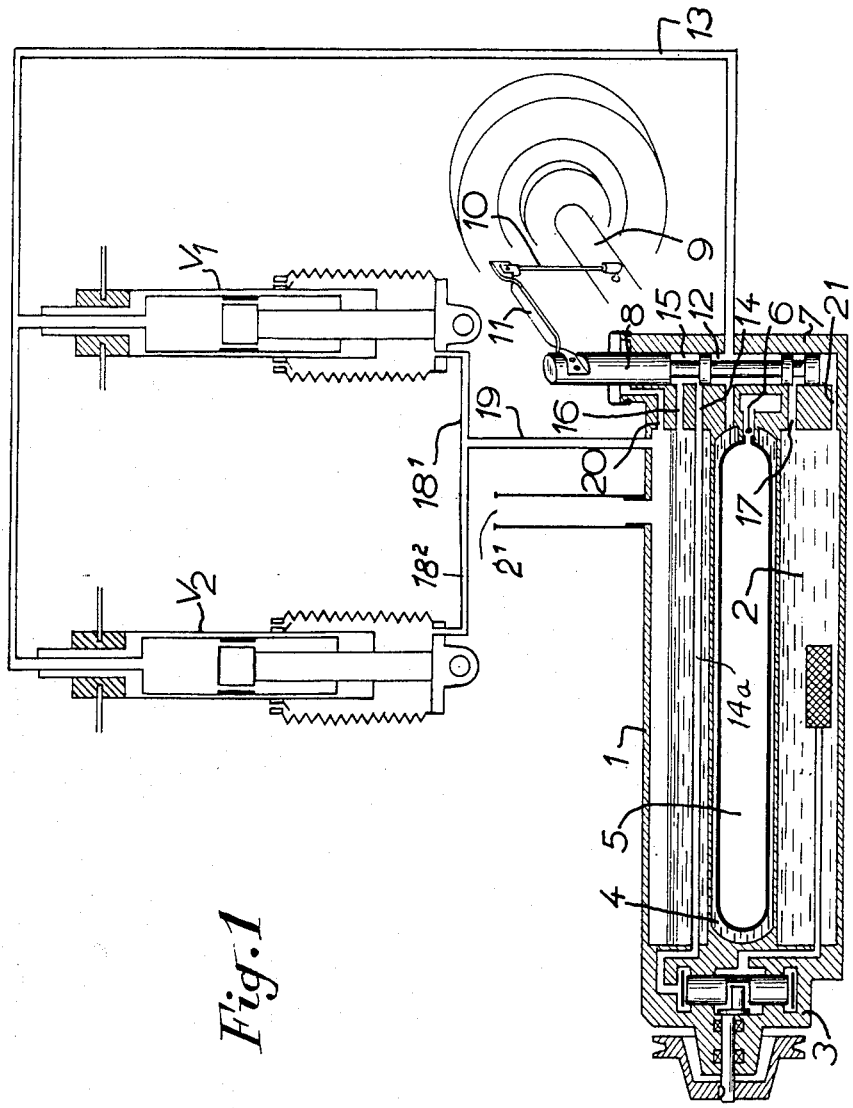

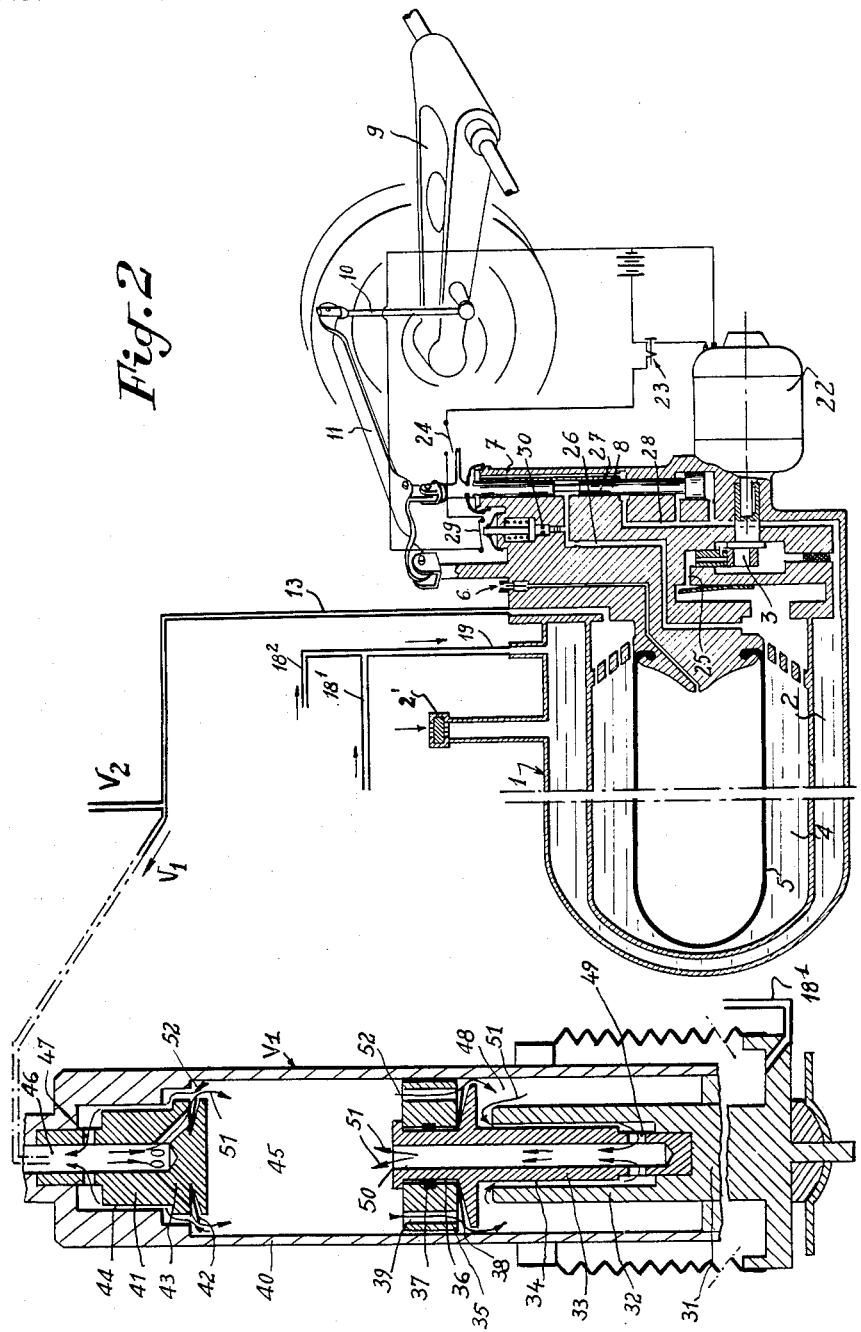

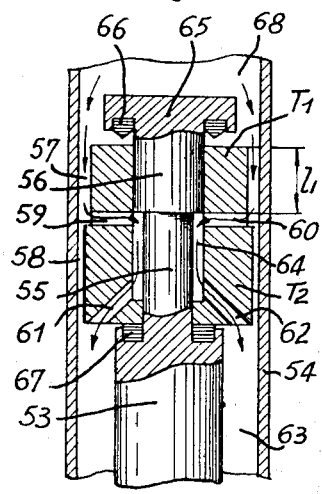
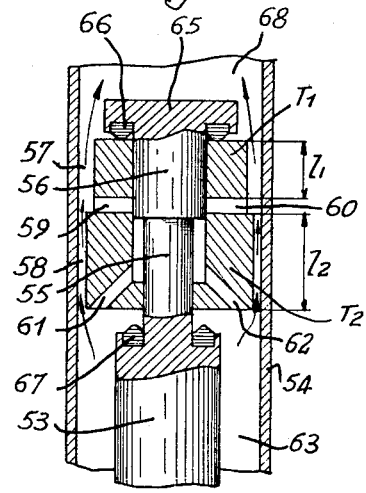

3,208,760
SUSPENSION FOR VEHICLES
Rene Lucien, Neuilly-sur-Seine, and Emile Tetart, Louvie Juzon, France, assignors to Société à Responsabilité Limitée Recherches Etudes Production R.E.P., Paris, France, a corporation of France
Filed Mar. 2, 1964, Ser. No. 348,338
Claims priority, application France, Mar. 2, 1963, 926,635, Patent 1,360,210, 926,636, Patent 1,364,607; Jan. 13, 1964, 960,161, Patent 1,390,338; Feb. 17, 1964, 964,-060, Patent 85,346
9 Claims. (Cl. 280—6)

The present invention has for its object a complete suspension system for vehicles, which is constituted by the combination of shock-absorber jacks with a monobloc unit in which are incorporated a hydraulic pump with its supply tank, an oleo-pneumatic accumulator and a distributor ensuring the automatic correction of the trim of the vehicle, the said monobloc unit being adapted to supply the said packs through appropriate connections.

Within the scope of the invention, this suspension can be either wholly oleo-pneumatic or mixed, that is to say combined with solid springs.

The system according to the invention is shown by way of example in the accompanying drawings, in which:

FIG. 1 is a view in axial cross-section of the whole of the suspension.

FIG. 2 shows the same suspension, in axial section, with a first form of construction of a shock-absorber jack according to the invention.

FIGS. 3 and 4 also represent a further form of construction of shock-absorber jack, in axial section.

Referring now to FIG. 1, in this figure the shock-absorber jacks illustrated in FIGS. 2 to 4, and assumed to be two in number, are shown diagrammatically at $V_1$ and $V_2$.

The oleo-pneumatic monobloc unit 1 comprises: a tank 2, open to free air at 2' and from which is supplied an oil pump 3, an oleo-pneumatic accumulator constituted by a chamber 4 comprising an elastic pocket 5 which is provided with a conventional tire inflating valve 6 and which contains a constant weight of gas, and finally a trim-correcting distributor 7, the slide-valve 8 of which is actuated by the displacements of the axle 9 by means of a crank 10 and a blade spring 11, which acts directly on the slide-valve.

The central chamber 12 of the distributor is connected by a conduit 13 to the shock-absorber jacks $V_1$ and $V_2$.

In the example shown in FIG. 1, the pump 3 is a pump with radial pistons driven by means of a pulley. It is obvious that the pump may be of any other type which complies with the conditions of working. The drive of the pump 3 can be effected by any other means, in particular by an electric motor, as shown in FIG. 2. A driving system which is advantageous due to its simplicity is constituted by a flexible shaft (not shown) coupled to the pump shaft. This enables the monobloc control device to be installed in the most suitable position in the vehicle.

As long as the trim of the vehicle remains normal, the delivery of the pump 3 is returned directly to the tank 2 through the conduit 14a, the orifice 14, the upper chamber 15 of the distributor and the orifice 16. This is the condition illustrated in FIG. 1.

When the vehicle is subjected to a static overload, the slide-valve 8 moves upwards with respect to the body 1, assumed to be rigidly fixed to the body of the vehicle, so that the pump delivers through the orifice 14 into the central chamber 12, and thus supplies on the one hand the jacks $V_1$ and $V_2$, and on the other hand the chamber 4 of the accumulator. In consequence, the trim of the vehicle is restored, the gas present in the elastic bag 5 being compressed to a pressure which counter-balances the load. If on the contrary, there occurs a reduction in the static load of the vehicle, the slide-valve 8 of the distributor moves downwards with respect to the body 1, beyond its mean position, so that the chamber 4 of the accumulator and the jacks $V_1$ and $V_2$ are connected to the tank through the chamber 12 and the orifice 17. The trim is re-established automatically when the pressure in the bag 5 again balances the static load.

The shock-absorber jacks $V_1$ and $V_2$ will preferably be of the type without packing rings, with recovery of leakage by simple gravity.

This recovery may be effected at the bottom by means of the return $18^1$, $18^2$, 19, to the tank, in the case of use of shock-absorber jacks comprising bellows.

In the example considered, the leakages from the distributor are returned to the tank through the bored passages 20 and 21.

The independence of the jacks with respect to the monobloc suspension unit has the advantage of facilitating assembly and maintenance while at the same time simplifying the construction. In addition, the direct recovery of the leakages from the various components by this monobloc unit eliminates the use of packing rings.

It should be observed that the control of the distributor, instead of being direct as in the example shown in the drawing, can be carried out from a distance by any appropriate device.

FIG. 2 of the accompanying drawings shows a form of embodiment of the invention in which the pump 3 is driven directly by an electric motor, the group comprising the motor, pump and distributor forming a single monobloc unit which ensures the electric control and regulation of the suspension and comprises an electrical safety device giving full protection.

FIG. 2 also shows a shock-absorber jack $V_1$ which also constitutes an object of the invention. The jack $V_2$, identical with $V_1$, has not been shown on the drawing.

In this figure, the parts numbered 1 to 11 have already been described with reference to FIG. 1 and have been given the same reference numbers.

The pump 3 is directly driven by an electric motor 22, supplied from the battery of the vehicle through the intermediary of a relay 23. This relay is assisted by a switch 24, the operation of which is directly effected by the movement of the slide-valve.

The operation is therefore simple: when the vehicle sinks as a result of an overload, the slide-valve 8 actuates the switch, the pump 3 is started-up and inflates the accumulator by delivering liquid into the chamber 4 by the direct conduit 25; the pressure rises, the trim is restored; as the movement of the slide-valve interrupts the control, the motor stops.

On the other hand, in the event of a reduction in load, the slide-valve puts the chamber 4 of the accumulator into communication with the tank through the intermediary of the conduit 26 of the groove 27 and of the conduit 28. This discharge stops as soon as the trim has been restored, the slide-valve then closing the passage between the conduits 26 and 28; in this case of discharge, the switch remains open and the motor thus does not rotate.

In addition, a safety device is constituted by a switch 29, the operation of which is effected by a piston 30 which breaks the contact in case of excessive pressure which could be caused by a very large overload on the vehicle, causing a too long operation of the motor, the latter trying to re-establish the trim of the vehicle.

In the example considered, the reserve of air is shown in the interior of the elastic bag and the oil at the exterior, in the oleo-pneumatic accumulator 4. It is however clear that the opposite arrangement is also possible, that is to say the delivery of oil to the interior of the bag and the air to the exterior.

The shock-absorber jack according to the invention, shown in this same FIGURE 2, is characterized in that:

(a) The upper rod of the jack piston comprises two distinct coaxial portions separated by an annular damping space;

(b) One of the parts of the upper rod of the piston comprises a piston separating two chambers of the jack cylinder, one above and the other below, communicating with each other, on the one hand through orifices of the separation piston, controlled by a clapper valve and permitting the liquid to pass freely and, on the other hand, through the intermediary of the annular damping space and orifices in the lower portion of the piston rod, the valve being open during compression and closed during expansion.

(c) A member is interposed in the hydraulic circuit connecting the jack chamber to the liquid accumulator, the communication between this upper chamber and the accumulator being effected either through the intermediary of a damping space comprised between the said member and the upper part of the cylinder, or through holes formed in the said member and permitting the unrestricted passage of the liquid, the said holes being closed by a clapper valve which is open during expansion and closed during compression.

The rod 31 of the jack piston comprises, towards its upper extremity, two separate coaxial portions, an external portion 32 and an internal portion 33, forming between them an annular damping space 34. The part 33 comprises a piston 35 mounted for free movement in the transverse sense on the part 33 with a slight play 36 and a packing ring 37, so as to permit easy centering of the piston 35. A clapper valve 38 carried by the piston 35 permits of the closure during expansion and the uncovering during compression of a series of orifices 39, formed in the piston 35 and permitting the unrestricted passage of the liquid.

The cylinder 40 of the jack is rigidly fixed for example to the body of a vehicle, while the rod 31 of the piston is fixed to an axle of the same vehicle.

At the upper extremity of the cylinder 40, a member 41 is interposed in the hydraulic circuit connecting the jack to the accumulator and carries a valve 42 which permits of the opening during expansion and the closure during compression of a series of passages 43, formed in the member 41 and permitting the liquid to pass freely. The member 41 is mounted in the cylinder 40 in such manner as to leave between itself and the upper portion of this cylinder a damping space 44, permitting the passage of the liquid between the upper chamber 45 of the cylinder 40 and the tube 46 which connects to the accumulator, through the intermediary of holes 27 providing unrestricted passage.

Similarly, the lower chamber 48 of the cylinder 40 communicates with the upper chamber 45 through the intermediary of the damping space 34 and then through a series of orifices 49 giving unrestricted passage to the liquid, formed in the inner part 33 of the rod 31, and finally of a cylindrical central passage 50 of the same part 33.

The operation of this shock-absorber jack is effected as follows:

During the expansion stroke of the piston of the jack, the rod 31 of the piston, coupled to an axle of the vehicle, drives the piston 35 downwards. The clapper-valve 38 closes and prevents the liquid from passing through the orifices 39 of the piston 35.

In consequence, a volume of liquid equal to the reduction in volume of the lower chamber 38 is evacuated in the direction of the arrows 51 through the space 34, the orifices 49 and the central passage 50 of the part 33, thus causing a damping action during the expansion stroke.

Simultaneously, the volume of liquid necessary to compensate for the complementary increase in volume of the upper chamber 45 passes from the accumulator to this chamber through the free orifices 43, the clapper-valve 42 being open.

During the compression stroke on the other hand, the clapper-valve 38 is open and the liquid passes freely in the direction of the arrows 52, from the upper chamber 45 to the lower chamber 48, through the orifices 39 of the piston 35. On the contrary, the valve 48 is then closed and the damping of compression is obtained by the forced passage of the liquid from the chamber 45 into the space 44 towards the accumulator.

In order to regulate each of the two damping actions, it is in consequence only necessary to regulate the dimensions—lengths and thicknesses—of the annular damping spaces 34 and 44. It is furthermore possible to obtain all the combinations of these two damping actions.

The form of construction of a further jack according to the invention, shown in FIGS. 3 and 4, also operates by asymmetric annular wire-drawing of the liquid.

This jack is essentially characterized in that:

(a) The piston rod comprises two thinner consecutive portions, of different diameters;

(b) On these thinner portions is movably mounted a floating head comprising two elements fixed together but of different diameters, one almost equal to the internal diameter of the cylinder so as to form at the periphery of the said head two annular spaces of different widths;

(c) The co-operation of one of the thinner portions of the rod with one of the elements of the floating head has the effect of alternately uncovering and covering orifices formed in the said head and in consequence, either to permit the liquid to circulate freely through these orifices, the damping effect then taking place in the relatively wide annular space (compression stroke), or to prevent the circulation through these orifices, the damping effect being then obtained by the narrow annular space (expansion stroke).

FIG. 3 corresponds to the compression stroke and FIG. 4 to the expansion stroke.

The piston rod 53, movable in the cylinder 54 which is assumed to be filled with liquid, comprises near its upper extremity, a portion 55 of smaller diameter, in turn surmounted by a portion 56 of intermediate diameter.

On this assembly 55–56 is slidably mounted an annular floating head having a characteristic shape as shown in the drawing. This floating head has in fact an upper element $T_1$, the diameter of which is substantially less than the internal diameter of the cylinder, so as to form an annular relatively large space 57—and a lower element $T_2$, the diameter of which is almost equal to that of the cylinder, so that the annular space 58 has only a very small radial width. The diameters of the bores of these elements $T_1$ and $T_2$ are equal; they correspond to that of the portion 56 of the piston rod.

At the coupling level of $T_1$ and $T_2$ are formed radial bores such as 59 and 60. From the base of the element $T_2$ start the oblique bores 61 and 62 which cause the chamber 63 located under the floating head to communicate with the annular chamber 64 comprised between the said element $T_2$ and the portion 55 of the rod.

The portion 56 is provided with a plate 65, fitted with an elastic abutment 66.

Similarly, at its coupling to the portion 55, the piston rod is provided with an elastic abutment 67.

It will be assumed that the piston rod 53 is rigidly fixed to the axle of the vehicle, while the cylinder 54 is fixed to the vehicle body. It will also be assumed that the upper chamber 68 of the cylinder is connected to the olea-pneumatic accumulator 4–5 of FIG. 1.

The operation of this shock-absorber jack is then effected as follows:

During the compression stroke (FIG. 3), the piston rod moves upwards; the floating head then comes into contact, through its element $T_2$, with the elastic abutment 67, so that the portion 56 uncovers the orifices 59 and 60 which, equally with the space 64 and the orifices 61 and 62, do not apply any appreciable braking effect on the circulation of the liquid delivered in the direction of the arrows from the chamber 68 towards the chamber 63.

On the other hand, such braking effect is produced by the annular space 57 over the length $l_1$.

During the expansion stroke (FIG. 4), the piston rod moves downwards; the element $T_1$ of the floating head then comes into contact with the elastic abutment 66. Simultaneously, the orifices 59 and 60 become closed by the portion 56. The circulation of the liquid delivered from the chamber 63 to the chamber 68 in the direction of the arrows can only take place through the annular space 58 which applies a braking effect over the length $l_2$.

It will be understood that by reason of the narrowness of this annular space 58 compared with the space 57, the braking of the liquid is asymmetric insofar as that during the expansion stroke, it is more powerful than during the compression stroke and this effect increases as the length $l_2$ can be chosen to be greater than $l_1$.

The choice of these lengths and of the spaces 57 and 58 thus offers a possibility of regulation of the shock-absorber jack over a very wide range, while preserving the asymmetric nature of the damping effect.

The shock-absorber jacks may also be of the type described in the United States Patents Nos. 2,756,046 of July 24, 1956, 2,843,396 of June 15, 1958 and 2,852,059 of Sept. 9, 1958.

In these jacks, the recovery of leakages is effected by conduits arranged at the upper part of the jack, which therefore is no longer provided with bellows.

In the examples described above, the oleo-pneumatic suspension is integral, that is to say the whole of the load of the vehicle is carried by the jacks $V_1$ and $V_2$. In certain forms of construction however, it may be advantageous to have a "solid" spring or springs of any type in co-operation with the oleo-pneumatic spring or springs. This co-operation makes it possible to employ a smaller weight of gas and in consequence to reduce the overall size of the unit. In addition, it generates a practically constant frequency in spite of the variations of the static load.

An essential advantage of all the arrangements described above consists in that they are not provided with any packing rings but only a few fixed joints.

What we claim is:

1. A suspension for vehicles, comprising in combination at least one shock-absorber jack and a monobloc unit connected to the said jack and including a hydraulic pump with a supply tank, an oleo-pneumatic accumulator in said tank containing a constant weight of gas and a distributor connected between said tank, said accumulator and said jack and controlled by the position of the vehicle for selectively distributing pressure fluid between the jack and the tank for the automatic correction of the trim of said vehicle.

2. A suspension for vehicles as claimed in claim 1, in which said accumulator is constituted by a chamber incorporated in said tank and containing an elastic bag filled with said constant weight of a gas under pressure.

3. A suspension for vehicles as claimed in claim 1, wherein said distributor comprises a slide-valve, a body accommodating said slide-valve and connected to said jack and contiguous with the tank, said body having bores which communicate with said tank, means for controlling said slide-valve by the oscillations of the vehicle axle, the movements of the slide-valve thus putting simultaneously the said chamber of the oleo-pneumatic accumulator and the jack selectively into connection with the pump and with the tank.

4. A suspension for vehicles as claimed in claim 1, wherein said distributor comprises a slide-valve, a body accommodating said slide-valve and connected to the jack and contiguous with the tank, said body having bores which communicate with said tank, a crank-spring blade system connecting one axle of the vehicle to said slide-valve, the displacements of said slide-valve thus putting simultaneously the said chamber of the oleo-pneumatic accumulator and the jack selectively into connection with the pump and with the tank.

5. A suspension for vehicles as claimed in claim 1, comprising conduits extending from the jack to the tank to permit leakage from the shock-absorber jack to be returned to the tank by gravity.

6. A suspension for vehicles as claimed in claim 1, and further comprising an electric motor for driving said hydraulic pump, and means for controlling the supply of the said motor by the movements of said slide-valve.

7. A suspension for vehicles as claimed in claim 1, and further comprising an electric motor for driving said hydraulic pump, a relay in the supply circuit of said motor, and a switch controlled by the movements of said slide-valve and controlling the opening and closing of said relay.

8. A suspension for vehicles as claimed in claim 1, and further comprising an electric motor for driving said hydraulic pump, a relay in the supply circuit of said motor, a switch controlled by the movements of said slide-valve and controlling the opening and closing of said relay, a second switch in series with said first switch, a piston subjected to the delivery pressure of said pump and acting so as to open said second switch in the event of excessive pressure.

9. A suspension for vehicles, comprising in combination at least one shock-absorber jack and a monobloc unit connected to the said jack and including a hydraulic pump with a supply tank, an oleo-pneumatic accumulator in said tank containing a constant weight of gas and a distributor connected between said tank, said accumulator and said jack and controlled by the position of the vehicle for selectively distributing pressure fluid between the jack and the tank for the automatic correction of the trim of said vehicle, said jack having unsealed joints whereby leakage is obtained therein, said jack being located above said monobloc, and a conduit extending from the jack to the tank for return of leakage from the jack to the tank.

References Cited by the Examiner

UNITED STATES PATENTS

| | | | |
|---|---|---|---|
| 2,970,831 | 2/61 | Wordsworth | 280—124 |
| 2,987,310 | 6/61 | Ord | 280—124 |
| 2,987,312 | 6/61 | Alliquant. | |
| 3,033,553 | 5/62 | Alliquant | 280—124 |
| 3,049,360 | 8/62 | Alliquant | 280—124 |
| 3,062,330 | 11/62 | Lyon | 280—124 |
| 3,085,796 | 4/63 | Wettstein | 267—64 |
| 3,088,726 | 5/63 | Dangauthier | 267—64 |
| 3,122,379 | 2/64 | Alliquant | 280—6.1 |

BENJAMIN HERSH, *Primary Examiner.*

LEO FRIAGLIA, *Examiner.*